K. C. RANDALL.
METHOD OF MAKING ELECTRIC SWITCH JAWS AND THE LIKE.
APPLICATION FILED APR. 12, 1915.
1,248,544.
Patented Dec. 4, 1917.
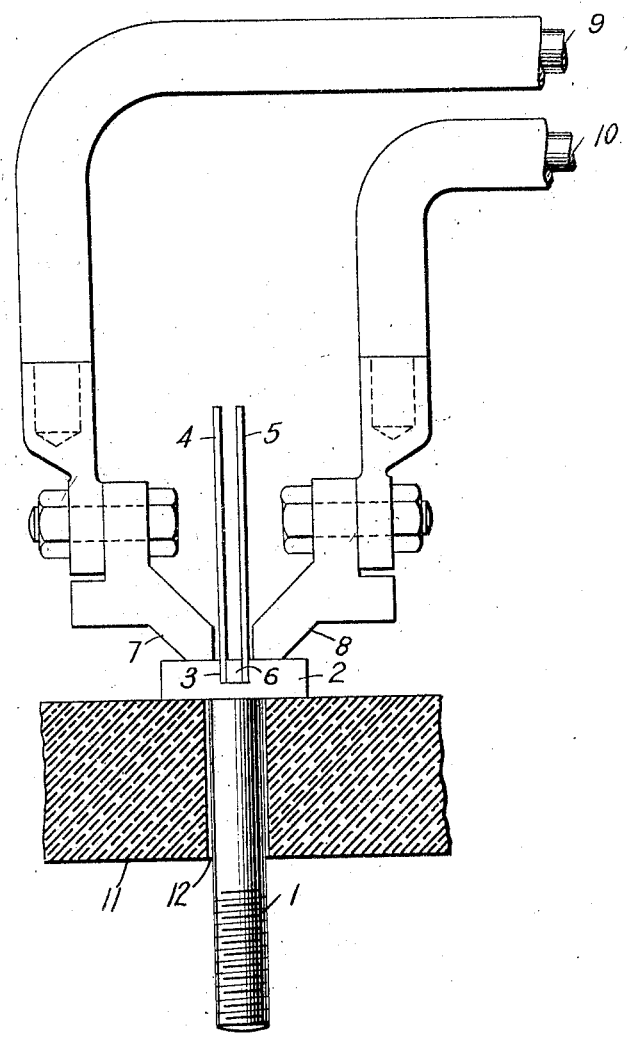
WITNESSES:
Fred H. Miller
P. Brown
INVENTOR
Karl C. Randall
BY
Wesley G. Carr
ATTORNEY

UNITED STATES PATENT OFFICE.

KARL C. RANDALL, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

METHOD OF MAKING ELECTRIC-SWITCH JAWS AND THE LIKE.

1,248,544.

Specification of Letters Patent.

Patented Dec. 4, 1917.

Application filed April 12, 1915. Serial No. 20,705.

*To all whom it may concern:*

Be it known that I, KARL C. RANDALL, a citizen of the United States, and a resident of Edgewood Park, in the county of Allegheny and State of Pennsylvania, have invented a new and useful Improvement in Methods of Making Electric-Switch Jaws and the like, of which the following is a specification.

My invention relates to methods of uniting metal pieces by welding or soldering, and it has special reference to the construction of jaws for gripping the switch blades of knife switches.

The single figure of the accompanying drawing illustrates a form of apparatus suitable for practising my invention.

In the usual construction of electric knife switches, the jaws which grip each switch blade are fastened, at a suitable distance apart to receive the knife blade between them, upon a block carried by the head of a switch stud, and the jaws are usually fastened in the jaw block by making a slot in the block for each of the jaws, driving in the jaws and soldering them in place. The stud and the jaw block are usually forged as a single unit and afterward machined, and these operations, as well as the cutting of the two slots, are relatively expensive.

I have devised a simpler and cheaper method of fastening switch jaws in the jaw blocks according to which I make use of a jaw block provided with a single large slot which corresponds, in size, to the slot that would be produced if the stock between the present slots were removed. The jaws are set in place in this slot and a copper block is driven between them to fill up the space between the ends of the jaws, and the assembled unit may then be soldered according to the usual methods. I find that silver solder is very suitable for uniting the assembled parts. This solder which, as obtained commercially, consists of approximately equal parts of metallic silver and yellow brass and which melts at about 650° C., is particularly resistant to shocks and temperature changes, and it is sufficiently cheap, in the small quantity required, to warrant its use.

According to a further development of my invention, I subject the assembled jaws and jaw block to the action of an electric current which may supply sufficient heat to weld the parts together without the use of solder or, if solder is used, the electric heat applied may be only sufficient to melt the solder. I may conveniently accomplish this electric heating operation by providing a slotted table of insulating material to serve as a support for the jaw block, together with a pair of contact members adapted to press upon the jaw block on both sides of the jaws. Electric current supplied to the contact members is thereby caused to flow through the assembled members that are to be joined together.

One arrangement for practising the foregoing process is illustrated in the accompanying drawing, in which 1 represents a switch stud carrying a jaw block 2 at its upper end, the jaw block 2 being provided with a slot 3. These parts may be conveniently die-cast from copper in a single operation. Jaws 4 and 5 are disposed in the slot 3 and are separated by a copper block 6 driven between the jaws, the resulting arrangement being equivalent to that produced by making a separate slot for each jaw.

Electric contact members 7 and 8, supplied with energy through conductors 9 and 10, are adapted to press upon the jaw block 2 on both sides of the jaws 4 and 5, the jaw block being supported upon a table 11 provided with a slot 12 for receiving the switch stud 1. The contact members 7 and 8 may conveniently be operated by means of a lever (not shown) to move upward sufficiently to clear the jaw block as it is inserted under the contact members and then to be lowered into engagement with the jaw block to complete the circuit.

While I have described my invention as applied to the construction of knife switch jaws, it is obvious that the principles of my invention may also be applied to uniting metal parts of other kinds, and it is therefore to be understood that no limitations are to be imposed upon my invention except such as are indicated in the appended claims.

I claim as my invention:

1. The method of uniting metal pieces that comprises forming a slot in one of the pieces, disposing a plurality of other pieces in spaced relation in the said slot, inserting a spacing block between the said other pieces, and applying heat to unite all of the said parts together.

2. The method of uniting metal pieces that comprises die-casting a member provided with a slot, disposing a plurality of pieces in spaced relation in the said slot, inserting a spacing block between the said pieces and applying heat to unite all of the said parts together.

3. The method of uniting metal pieces that comprises forming a slot in one of the pieces, disposing a plurality of other pieces in spaced relation in the said slot, inserting a separate spacing block between the said other pieces and soldering all of the said parts together.

4. The method of uniting metal pieces that comprises forming a slot in one of the pieces, disposing a plurality of other pieces in spaced relation in the said slot, inserting a metal spacing block between the said other pieces, disposing electric contact members in engagement with the said slotted piece and supplying current to the said contact members, whereby the said pieces are heated to unite them together.

5. The method of forming jaw members for knife switches that comprises die-casting an integral stud and switch block provided with a single slot adapted to receive a pair of switch jaws in spaced relation, placing a pair of jaw members in position in the said slot, inserting a metal spacing block between the ends of the said jaws that are received in the said slot, and applying heat to unite all of the said parts together.

6. A jaw member for electric knife switches comprising a die-cast integral stud and switch block, a pair of jaw members disposed in a single slot in the said switch block, and a metal spacing block inserted between the said jaws, the said switch block, jaws and spacing block being intimately secured together.

7. A jaw member for electric knife switches comprising a die-cast integral stud and switch block, a pair of jaw members disposed in a single slot in the said switch block, and a metal spacing block inserted between the said jaws, the said switch block, jaws and spacing block being intimately soldered together.

In testimony whereof, I have hereunto subscribed my name this 31st day of March, 1915.

KARL C. RANDALL.